UNITED STATES PATENT OFFICE.

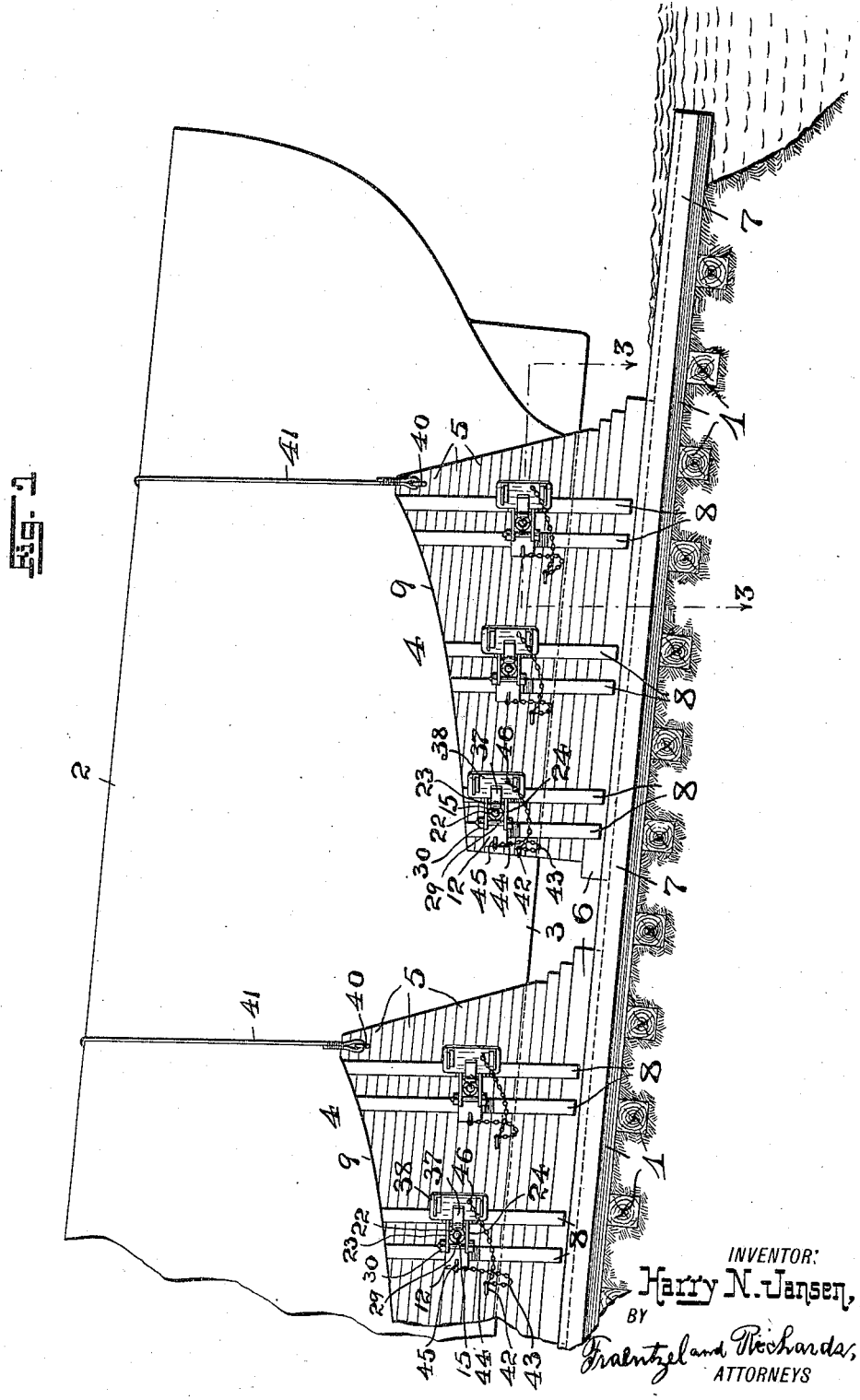

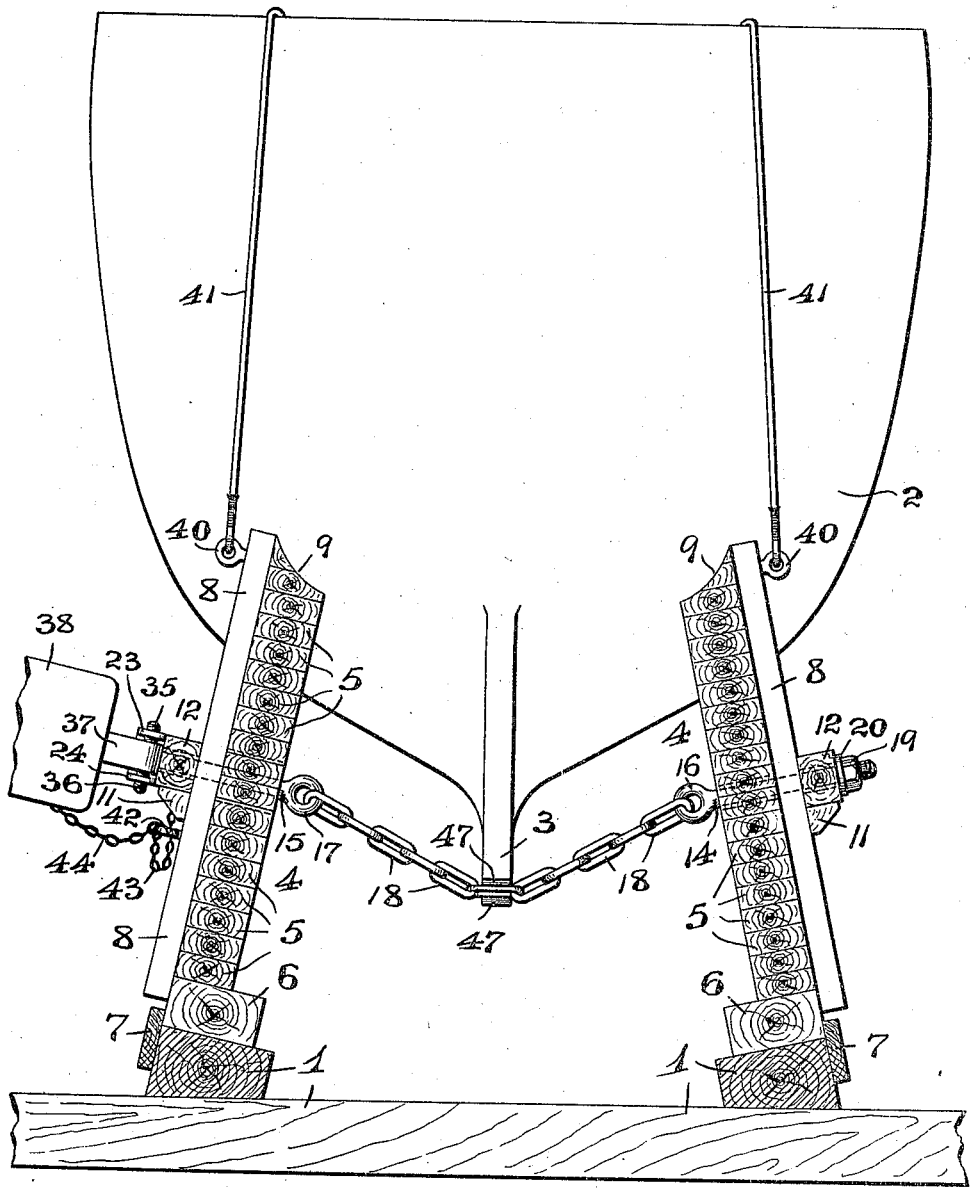

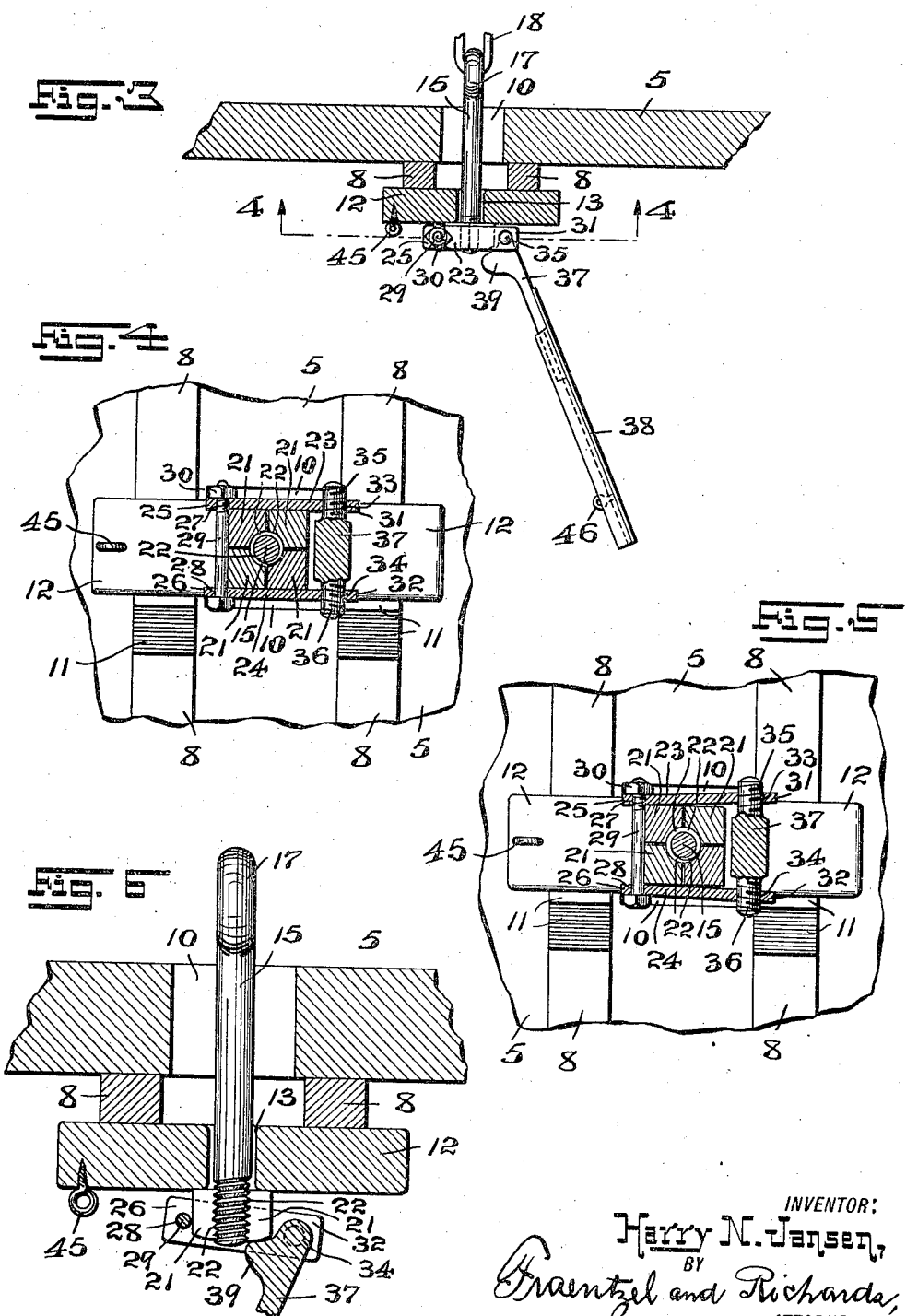

HARRY N. JANSEN, OF NEWARK, NEW JERSEY.

RELEASING AND LOSS-PREVENTING MEANS FOR CRADLE-PACKINGS.

1,299,951.  Specification of Letters Patent.  Patented Apr. 8, 1919.

Application filed February 12, 1919. Serial No. 276,636.

*To all whom it may concern:*

Be it known that I, HARRY N. JANSEN, a citizen of the United States, residing at Newark, in the county of Essex and State of New Jersey, have invented certain new and useful Improvements in Releasing and Loss-Preventing Means for Cradle-Packings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The invention relates, generally, to improvements in ship-building; and, the present invention has reference, more particularly, to a novel means for releasing and preventing the loss of cradle-packings when the ship-body leaves the ways and strikes the water.

The present invention, therefore, has for its principal object to provide a novel and automatically operating means or mechanism which coöperates with the water, as the ship-body leaves the ways, to release the supporting cradle-packings, and to prevent the loss of the same, especially when the ship-body is to be floated in shallow water, by the cradle-packings becoming stuck in the mud or other bottom of the water. Other objects of the present invention not at this time more particularly enumerated will be clearly understood from the following detailed description of the said invention.

With the various objects of the present invention in view, the said invention consists, primarily, in the means for releasing and preventing the loss of cradle-packings hereinafter set forth; and, the present invention consists, furthermore, in the novel arrangements and combinations of the various devices and parts, as well as in the details of the construction of the said parts, all of which will be more fully described in the following specification, and then finally embodied in the clauses of the claim which is appended to and which forms an essential part of the said specification.

The invention is clearly illustrated in the accompanying drawings, in which:—

Figure 1 is a side elevation of the stern portion of a ship-body, two members of the cradle-packing, and the fixed ways upon which the said body and packings are disposed before launching, the said packings being shown provided with means or mechanism for releasing and preventing the loss of the packing during the floating of the ship-body; and Fig. 2 is a rear elevation of the said devices and parts, looking toward the stern of the ship-body.

Fig. 3 is a horizontal sectional representation of one of the cradle-packings, and the said releasing and loss-preventing means, said section being taken on line 3—3 in said Fig. 1, and said view being made on an enlarged scale; and Fig. 4 is a vertical section taken on line 4—4 in said Fig. 3, said view being made on a larger scale.

Fig. 5 is a view, similar to Fig. 4, showing the mechanism in its operated position, about to release the packing from the side of the ship-body; and Fig. 6 is a view, similar to Fig. 3, also showing the parts of the mechanism in their operated positions.

Similar characters of reference are employed in all of the said above described views, to indicate corresponding parts.

Referring now to the several figures of the drawings, the reference-character 1 indicates the usual fixed ways, such as are ordinarily used in ship-yards; 2 indicates a ship-body, and 3 is a keel thereof. The reference-character 4 indicates, in general, the cradle-packings, such as are fixed against the opposite sides of the ship-body, for properly propping said ship-body in position upon the ways 1, and are used with said body for sliding the latter into the water during the launching of the vessel.

Any desirable number of such packings may be employed according to the size and length of the ship, as will be clearly evident. Each cradle-packing is usually made up of a number of elements, as 5, suitably secured together in assembled relation, and each packing has a lower member 6, commonly termed the sliding way, which is movably disposed upon the fixed ways 1. As shown in Fig. 2 of the drawings, the ways 6 of the oppositely placed packings 4 are movably disposed against lateral displacement between the guard-rails 7 of the two main members of the fixed ways 1.

Upon their outer face-portions the assembled members or elements 5 have suitably secured thereto any suitable and desired number of vertically disposed bars, as 8, said bars being arranged in pairs, and being known in the ship-building art as strong-backs. The upper marginal edge of each packing is suitably curved, as at 9, see Figs. 1 and 2 of the drawings, so as to conform to the contour of the outer surface of the ship-body, and to thereby provide a proper and staple support for said body. Each packing is also provided with any desired number of suitably formed openings, as 10, according to number of pairs of strong-backs that may be employed. Directly beneath each opening 10, the members or bars 8 of each pair are provided with brackets or supporting members, as 11, and loosely placed upon each pair of brackets 11, so as to be located directly in front of an opening 10, is a member or bail 12, each bail being provided with an opening 13. Disposed in the openings 13 of the various bails 12 are eye-bolts of suitable lengths, the eye-bolts provided with the packings upon one side of the ship-body being designated by the reference-character 14, and those employed with the packings upon the other side of the ship-body being designated by the reference-character 15, as indicated in Fig. 2 of the drawings. Connecting the eye-portions 16 and 17 of the respective eye-bolts 14 and 15 is a suitable cable or chain, as 18, or other suitable flexible connection. Upon the screw-threaded portions of the said eye-bolts 14, which extend beyond the openings of the bails with which the said eye-bolts 14 are employed, are adjusting or tightening nuts 19 and washers 20. Upon the screw-threaded portions of the eye-bolts 15, which extend beyond the openings of the bails with which said eye-bolts 15 are employed, are clamping devices, comprising a number of sections 21, usually four of them, see Figs. 4 and 5 of the drawings, which are provided with thread-portions 22, adapted to engage the threads of the eye-bolt, when the said sections 21 are disposed in the manner of a nut, as shown in said figures, about the screw-threaded shank of the eye-bolt 15. Suitably disposed upon opposite sides of the sectional nut thus provided are a pair of plates 23 and 24 having their respective end-portions projecting beyond the nut, as shown in the several figures of the drawings. The projecting ends 25 and 26 of the respective plates 23 and 24 are provided with holes or perforations 27 and 28, and mounted in these holes or perforations is a bolt 29 provided upon its screw-threaded portion with a tightening nut 30. The opposite projecting ends 31 and 32 of the respective plates 23 and 24 are also provided with holes or perforations 33 and 34, as shown, which, however, are internally screw-threaded, one with a left-hand thread and the other with a right-hand thread. Arranged in these screw-threaded holes 33 and 34 are a pair of correspondingly screw-threaded studs 35 and 36 extending on opposite sides of a lever or arm 37 to which is secured in any suitable manner a suitably constructed wing or paddle, as 38. At or near its point of pivotal connection with said plates 23 and 24, the said lever or arm 37 is provided with a projection 39, in the form of a cam, or the like, which is adapted to be brought into forcible contact or engagement with the sectional nut, in the manner illustrated in Fig. 6 of the drawings, and for the purposes to be presently more fully set forth.

To prevent loss of the various cradle-packings upon the launching of the ship-body, either by said packings floating away or by becoming stuck fast in the mud or river-bottom, each packing may be provided with an eye 40, or other suitable fixture, to which is attached an end of a cable, rope, or other suitable flexible connection, as 41, the other end of which is suitably secured to any desired part of the ship-body. Likewise, an eye 42, or other suitable fixture, may be secured to each packing, two cables or other flexible connections, as 43 and 44 being attached at their one ends to said eye 42, and at their opposite ends to eyes 45 and 46, or other suitable fastening devices, with which the bails 12 and the wings or paddles are respectively provided.

Having in the foregoing described the general arrangements and constructions of the several devices and parts which embody the principles of the present invention, I will now briefly set forth the manner of assembling and setting up the said devices upon the sides of the ship-body, so that the latter can be launched, and upon launching the said cradle-packings being immediately and automatically released, so that said packings may not become lost or stuck in the mud, and can be readily picked up from the sides of the floated ship-body, at minimum expenditure of labor and cost.

After having disposed the various packings upon the ways 1 and in their supporting relations upon the opposite sides of the ship-body, the eye-bolts 15 are put in place in the respective packings upon the one side of the ship-body, so that the threaded end-portions of said bolts will project beyond the outer faces of the respective bails 12. With the cam-lever or arm 37 and the wing or paddle 38 turned in the manner indicated in Fig. 6 of the drawings, the plates 23 and 24 are slipped over the nut-sections 21 previously disposed about said threaded shank-portion, said plates being secured in place by means of the bolt 29 and its tightening nut 30, and said plates 23 and 24 assuming the positions indicated in Fig. 5 of the drawings. The cam-lever or arm 37 and wing or paddle 38 are now moved from the position represented in said Fig. 6 to the position shown in Fig. 3 of the drawings. The consequent rotative movement of the left and right screw-threaded studs 35 and 36, as will be evident, will bring the two plates 23 and 24 into firmly clamped relation with the nut-sections 21, whereby the sectional nut is securely and immovably mounted in proper position of the screw-threaded shank of the eye-bolt 15, as will be clearly evident. In this manner, the various eye-bolts 15 and other parts are fixed in their assembled relations with the respective packings. The cables or chains 18 attached to the eyes 17 of the respective bolts 15 are slung under the keel, and the eye-bolts 14, to which the said cables or chains are also attached, as has been previously stated, are put in place in the respective packings upon the other side of the ship-body, with the screw-portions of said eye-bolts projecting from the respective bails 12 used with said packings. The various devices and parts are thereupon secured in their tightened relation by the screwing down upon the said shank-portions of the previously mentioned tightening nuts 19 against the washers 20. As an extra precaution to secure an extra taut relation of the cables or chains 18, wedges 47 may be driven between the keel and the cable or chain, as indicated in Fig. 2 of the drawings.

As soon as the ship-body is being launched, and the wings or paddles 38 in the position indicated in Fig. 3 of the drawing, strike the water, the counteracting forces of the water against the face of each wing or paddle 37, will move the latter from the position shown in said Fig. 3 to that represented in Fig. 6, the consequent rotary action of the left and right-threaded studs 35 and 36, loosening the plates 23 and 24 from their binding and holding engagement with the nut sections 21, and the action of the cam-projection 39 withdrawing said plates entirely from contact with the nut-sections. The weight of each chain 18 will thus withdraw each released eye-bolt from the bail and packing, so that the latter will float out of the way of the ship-body, the various devices and parts being retained againts loss by the various chains or cables 41, 43 and 44, as will be fully understood.

Of course, I am aware that changes may be made in the general arrangements and combinations of the various parts, as well as in the details of the construction of the said parts, without departing from the scope of the present invention as set forth in the foregoing specification, and as defined in the clauses of the claim which are appended to the said specification. Hence, I do not limit my present invention to the exact arrangements and combinations of the several devices and parts as described in the said specification, nor do I confine myself to the exact details of the construction of the said parts, as illustrated in the accompanying drawings.

I claim:—

1. In combination with a pair of cradle-packings adapted to be located upon opposite sides of a ship-body, a flexible connection between and detachably connected with said packings, and means connected with said flexible connection for automatically releasing said packings as the ship-body is launched.

2. In combination with a pair of cradle-packings adapted to be located upon opposite sides of a ship-body, said packings being provided with openings, bolts disposed in said openings, a flexible connection between and connected with said bolts, means connected with one of said bolts for securing the same in position to the packing, but adapted to automatically release said bolt as the ship-body is launched, and means connected with the other bolt for tightening said flexible connection and holding said packings in their supporting relation against the opposite sides of the ship-body.

3. In combination with a pair of cradle-packings adapted to be located upon opposite sides of a ship-body, said packings being provided with openings, bolts disposed in said openings, a flexible connection between and connected with said bolts, each bolt having a screw-threaded portion, a sectional nut mounted upon the screw-threaded portion of one of said bolts, means coöperating with said sectional nut for securing the same in a fixed position upon said screw-threaded portion but adapted to automatically release said sectional nut as the ship-body is launched, and a tightening nut upon the screw-threaded portion of the other bolt.

4. In combination with a pair of cradle-packings adapted to be located upon opposite sides of a ship-body, said packings being provided with openings, bolts disposed in said openings, a flexible connection between and connected with said bolts, each bolt having a screw-threaded portion, a sectional nut mounted upon the screw-threaded portion of one of said bolts, means coöperating with said sectional nut for securing the same in a fixed position upon said screw-threaded portion but adapted to automatically release said sectional nut as the ship-body is launched, said means consisting of a pair of clamping plates disposed upon opposite sides of said sectional nut, a bolt and nut for securing said plates in such position, said plates having perforations respectively provided with left and right-hand screw-threads, a cam-lever having oppositely extending studs respectively provided with left and right-hand screw-threads mounted and working in said perforations and a wing carried by said cam-lever, and means connected with the other bolt for tightening said flexible connections and holding said packings in their supporting relation against the opposite sides of the ship-body.

5. In combination with a pair of cradle-packings adapted to be located upon opposite sides of a ship-body, said packings being provided with openings, bolts disposed in said openings, a flexible connection between and connected with said bolts, each bolt having a screw-threaded portion, a sectional nut on one of said bolts, means coöperating with said sectional nut for securing the same in a fixed position upon said screw-threaded portion but adapted to automatically release said sectional nut as the ship-body is launched, said means consisting of a pair of clamping plates disposed upon opposite sides of said sectional nut, a bolt and nut for securing said plates in such position, said plates having perforations respectively provided with left and right-hand screw-threads, a cam-lever having oppositely extending studs respectively provided with left and right-hand screw-threads mounted and working in said perforations, and a wing carried by said cam-lever, and a tightening nut upon the screw-threaded portion of the other bolt.

6. In combination with a cradle-packing for ship-bodies, said packing being provided with a bolt-receiving opening, strong-backs mounted upon said packing, a bail disposed upon said strong-backs, said bail having a perforation, a bolt in the receiving opening of said packing and having a portion extending into and through the perforation in said bail, means upon the projecting portion of said bolt for holding the same in place, and means for automatically releasing said bolt-holding means.

7. In combination with a cradle-packing for ship-bodies, said packing being provided with a bolt-receiving opening, strong-backs mounted upon said packing, or bail disposed upon said strong-backs, said bail having a perforation, a bolt in the receiving opening of said packing and having a portion extending into and through the perforation in said bail, said projecting portion being screw-threaded, a sectional nut disposed upon said screw-threaded portion of the bolt, and means coöperating with said sectional nut for securing the same in a fixed position upon the screw-threaded portion of the bolt, but adapted to automatically release said sectional nut.

8. In combination with a cradle-packing for ship-bodies, said packing being provided with a bolt-receiving opening, strong-backs mounted upon said packing, a bail disposed upon said strong-backs, said bail having a perforation, a bolt in the receiving opening of said packing and having a portion extending into and through the perforation in said bail, said projecting portion being screw-threaded, a sectional nut disposed upon said screw-threaded portion of the bolt, and means coöperating with said sectional nut for securing the same in a fixed position upon the screw-threaded portion of the bolt, but adapted to automatically release said sectional nut, comprising a pair of clamping plates and means for clamping said plates in position upon the opposite sides of said sectional nut, and means connected with said plates for forcing said clamping plates out of their clamped relation with said sectional nut.

9. In combination with a cradle-packing for ship-bodies, said packing being provided with a bolt-receiving opening, strong-backs mounted upon said packing, a bail disposed upon said strong-backs, said bail having a perforation, a bolt in the receiving opening of said packing and having a portion extending into and through the perforation in said bail, said projecting portion being screw-threaded, a sectional nut disposed upon said screw-threaded portion of the bolt, and means coöperating with said sectional nut for securing the same in a fixed position upon the screw-threaded portion of the bolt, but adapted to automatically release said sectional nut, comprising a pair of clamping plates and means for clamping said plates in position upon the opposite sides of said sectional nut, a lever pivotally connected with said clamping plates, and a cam-projection upon said lever adapted to engage said sectional nut and to force said clamping plates out of their clamped relation with said sectional nut.

10. In combination with a cradle-packing for ship-bodies, said packing being provided with a bolt-receiving opening, strong-backs mounted upon said packing, a bail disposed upon said strong-backs, said bail having a perforation, a bolt in the receiving opening of said packing and having a portion extending into and through the perforation in said bail, said projecting portion being screw-threaded, a sectional nut disposed upon said screw-threaded portion of the bolt, and means coöperating with said sectional nut for securing the same in a fixed position upon the screw-threaded portion of the bolt, but adapted to automatically release said sectional nut, said means consisting of a pair of clamping plates disposed upon opposite sides of said sectional nut, a bolt and nut for securing said plates in position, said plates having perforations respectively provided with left and right-hand screw-threads, a cam-lever having oppositely extending studs respectively provided with left and right-hand screw-threads mounted and working in said perforations, and a wing carried by said cam-lever.

In testimony that I claim the invention set forth above I have hereunto set my hand this 10th day of February, 1919.

HARRY N. JANSEN.

Witnesses:
 FREDK. C. FRAENTZEL,
 WILLIAM A. DEAN.

Copies of this patent may be obtained for five cents each, by addressing the "Commissioner of Patents, Washington, D. C."